Feb. 19, 1929.

R. L. COOK 1,702,931

MIXER

Filed March 17, 1928

INVENTOR.
RALPH L. COOK.

BY
ATTORNEYS.

Patented Feb. 19, 1929.

1,702,931

UNITED STATES PATENT OFFICE.

RALPH L. COOK, OF MOORESVILLE, INDIANA.

MIXER.

Application filed March 17, 1928. Serial No. 262,395.

This invention relates to a mixer for mixing feeds and material of various kinds.

The principal object of the invention is provide a mixer which is capable of receiving the material to be mixed and discharging the same after mixing from the same end thereof. This is accomplished by providing a mixer of the drum type which is closed at one end and provided at the other end with a hopper for receiving the material and suitable buckets for scooping the material from the hopper and delivering it to the interior of the mixer when rotating in one direction, whereby said material will be carried to the far closed end thereof and agitated during its passage therethrough. Upon the mixer being rotated in the opposite direction, suitable interior buckets are provided for receiving the mixed material when returned from the closed end and causing it to pass from the drum into a chamber from which it is discharged.

Figure 1:
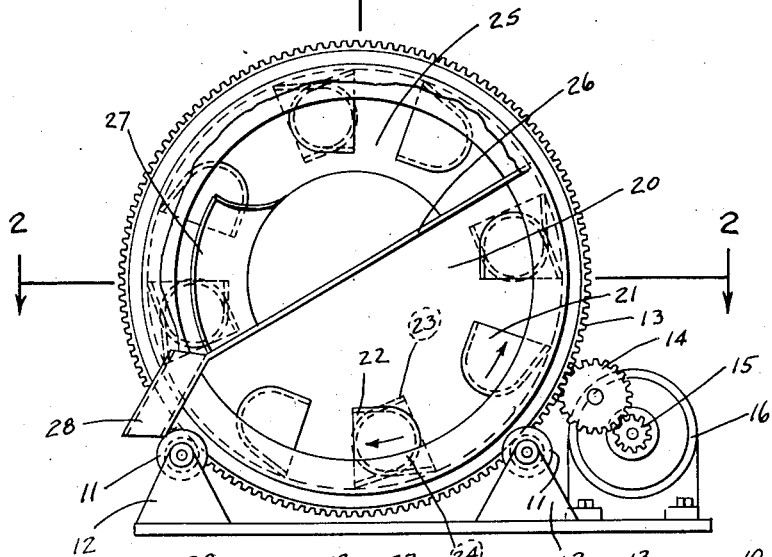
Figure 2:
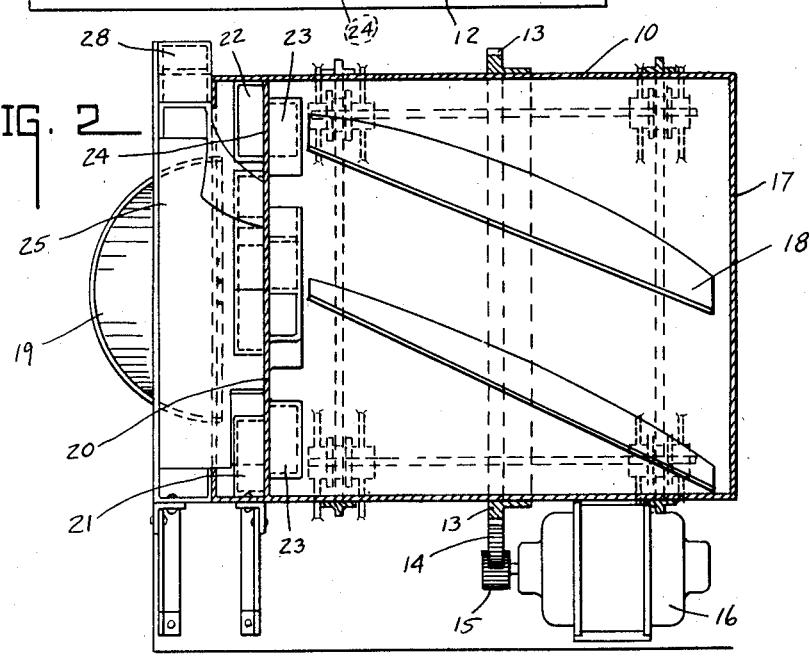

The full nature of the invention will be more clearly understood from the accompanying drawings and the following description and claims:

Fig. 1 is an end elevation of the intake and discharge end of the mixer. Fig. 2 is a section taken on the line 2—2 of Fig. 1.

In the drawings there is shown a rotating mixing drum 10 supported by the rollers 11 on the brackets 12. Said drum is surrounded by a gear ring 13 which is engaged and driven by the gear 14 meshing with the gear 15 on the motor 16. The motor 16 is of the reversible type whereupon the mixing drum may be rotated first in one direction and then the other upon reversing the motor 16. Said drum is closed at one end, as indicated at 17, and is provided with a plurality of spirally disposed mixing plates 18 secured to the inner surface thereof and extending from adjacent one end to the other.

Mounted adjacent what may be termed the front end of the mixer there is a hopper 19 for receiving the material to be mixed, said material being dumped in the hopper 19 in predetermined quantities. Secured to the front end of the hopper, which may be indicated by the numeral 20, there are a plurality of buckets 21 which are adapted to carry the material upward when the mixer is moving in a counter-clockwise direction as indicated by the arrow positioned on one of said buckets. Intermediate the buckets 21 and mounted on the outer surface of the end 20 there are oppositely positioned buckets 22 which are adapted to scoop the material and carry it when the mixer is rotated in a clockwise direction as indicated by the arrow thereon. On the interior of the drum there are a plurality of similar buckets 23 secured to the inner face of the end 20, which are adapted to scoop up and carry the material when the mixer is rotated in a counter-clockwise direction. The buckets 22 and 23 on opposite sides of the end 20 are oppositely disposed and are in communication with each other by reason of openings therebetween in the end 20, as shown by dotted lines in Fig. 1 and indicated at 24.

Mounted exteriorly of the front end 20 of the drum there is a closure 25 for providing a discharge chamber having a sloping bottom portion 26 into which the material may be conveyed by the buckets 21 and discharged. A suitable protecting plate 27 is mounted therein to provide a passage for the buckets and protect the same from the material discharged into the chamber. An inclined chute 28 is in communication with the lower end of the chamber through which the finely mixed material may be discharged.

In operation, the material to be mixed is placed in the hopper 19. The mixer is rotated in clockwise direction whereupon the material is scooped up by the buckets 22. As the material is picked up thereby it passes through the opening 24 into the buckets 23. As these buckets are reversed they discharge the material inside of the drum at the front end thereof. The material is then mixed and worked toward the rear or closed end thereof by the action of the spiral webs 18. After the entire batch has been delivered into the drum from the hopper 19 and moved toward the rear end thereof, the continued rotation further acts to mix the material.

After the material has been thus thoroughly mixed, the motor 16 is reversed and the drum is rotated in the opposite or counter-clockwise direction, whereupon the material is carried by the plates 18 to the front of the drum where it is picked up by the buckets 23 and caused to pass back through the openings 24 to the buckets 22 which discharge it, since they are moving in the opposite direction. As the material is discharged from the buckets 22, it is picked up by the buckets 21 and carried into the chamber 25 into which it is dumped from said buckets and discharged through the chute 28.

By reason of this arrangement and action, it will be noted that the intake and discharge of the material into the mixing drum is effected from the same end, which, for reasons needless to express herein, is highly desirable for convenience of handling and more complete mixing. While the mixer has been herein described as being applied to material such as grain and feeds, building material and the like, it will be apparent that it is equally applicable to use for liquids which, within the scope of this invention, may be included in the term "material."

The invention claimed is:

1. A mixer for mixing a batch of materials comprising a rotating drum, means for alternately rotating said drum in opposite directions, means for causing the material received at one end of said drum to pass to the other end thereof when rotated in one direction and returned to the first end when rotated in the opposite direction, and a plurality of scoops positioned on one end of said mixer for engaging and discharging the material into the mixer when rotated in one direction and engaging and discharging material from the interior thereof when rotated in the opposite direction.

2. A mixer for mixing a batch of materials comprising a rotating drum, means for alternately rotating said drum in opposite directions, means for causing the material received at one end of said drum to pass to the other end thereof when rotated in one direction and returned to the first end when rotated in the opposite direction, a plurality of buckets mounted on the exterior of one end of said mixer, and a plurality of buckets mounted on the interior of said end, some of said buckets being in communication with others through said end of the mixer for discharging the material into the mixer when rotated in one direction and discharging it therefrom when rotated in the opposite direction.

3. A mixer for mixing a batch of materials comprising a rotating drum, means for alternately rotating said drum in opposite directions, means for causing the material received at one end of said drum to pass to the other end thereof when rotated in one direction and returned to the first end when rotated in the opposite direction, a hopper associated with one end of the mixer, a discharge chamber mounted thereon, and a plurality of buckets associated therewith for engaging and carrying the material from the hopper to the interior of the mixer when rotated in one direction, and engaging and carrying the material from the interior of the mixer to the discharge chamber when rotated in the opposite direction.

4. A mixer for mixing a batch of materials comprising a rotating drum, means for alternately rotating said drum in opposite directions, means for causing the material received at one end of said drum to pass to the other end thereof when rotated in one direction and returned to the first end when rotated in the opposite direction, a hopper associated with one end of the mixer for receiving the material to be mixed, a discharge spout mounted above said hopper, a plurality of buckets adapted to carry the material from the hopper and cause it to pass into the interior of the mixer when rotated in one direction, a plurality of buckets on the interior of the mixer adapted to engage the material and discharge it through the end thereof to the exterior thereof, and a plurality of buckets on the exterior thereof for receiving the material discharged and conveying it to the discharge spout when the mixer is rotated in the opposite direction.

5. A mixer for mixing a batch of materials comprising a rotating drum, means for alternately rotating said drum in opposite directions, a plurality of spirally disposed vanes mounted about the inner periphery thereof and extending from adjacent one end to the other, a hopper associated with one end of the mixer for receiving the material to be mixed, a discharge spout mounted above said hopper, a plurality of buckets adapted to carry the material from the hopper and cause it to pass into the interior of the mixer when rotated in one direction, a plurality of buckets on the interior of the mixer adapted to engage the material and discharge it through the end thereof to the exterior thereof, and a plurality of buckets on the exterior thereof for receiving the material discharged and conveying it to the discharge spout when the mixer is rotated in the opposite direction.

In witness whereof I have hereunto affixed my signature.

RALPH L. COOK.